(12) United States Patent
Cheng et al.

(10) Patent No.: US 9,661,039 B2
(45) Date of Patent: May 23, 2017

(54) RECOMMENDING RESOURCES TO MEMBERS OF A SOCIAL NETWORK

(71) Applicant: LinkedIn Corporation, Mountain View, CA (US)

(72) Inventors: Heyning Cheng, Los Gatos, CA (US); Navneet Kapur, Sunnyvale, CA (US); Ganesh Ramesh, Cupertino, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 256 days.

(21) Appl. No.: 13/890,693

(22) Filed: May 9, 2013

(65) Prior Publication Data

US 2014/0297746 A1 Oct. 2, 2014

Related U.S. Application Data

(60) Provisional application No. 61/806,341, filed on Mar. 28, 2013.

(51) Int. Cl.
*G06F 15/16* (2006.01)
*H04L 29/06* (2006.01)
*G06F 17/30* (2006.01)
*G06Q 50/00* (2012.01)
*H04L 29/08* (2006.01)

(52) U.S. Cl.
CPC .......... *H04L 65/40* (2013.01); *H04L 65/1089* (2013.01); *H04L 65/4053* (2013.01); *H04L 67/02* (2013.01); *H04L 67/306* (2013.01); *G06F 17/30867* (2013.01); *G06Q 50/01* (2013.01); *H04L 67/22* (2013.01)

(58) Field of Classification Search
CPC .......................... G06Q 50/01; G06F 17/30867
USPC ................................... 709/204, 205
See application file for complete search history.

(56) References Cited

U.S. PATENT DOCUMENTS

| | | | |
|---|---|---|---|
| 2008/0082565 A1* | 4/2008 | Chang et al. | 707/102 |
| 2009/0204599 A1* | 8/2009 | Morris et al. | 707/5 |
| 2011/0320441 A1* | 12/2011 | Lee et al. | 707/723 |
| 2012/0072550 A1* | 3/2012 | Anufrieva | 709/219 |
| 2012/0116905 A1* | 5/2012 | Futty | G06F 17/30867 705/26.1 |
| 2012/0179552 A1* | 7/2012 | Tishkevich | G06Q 30/02 705/14.66 |
| 2013/0085844 A1* | 4/2013 | Neystadt | G06Q 50/01 705/14.49 |
| 2013/0144949 A1* | 6/2013 | Mitchell et al. | 709/204 |
| 2013/0212229 A1* | 8/2013 | Vastardis | G06Q 50/01 709/219 |

(Continued)

*Primary Examiner* — Wing F Chan
*Assistant Examiner* — Joseph Maniwang
(74) *Attorney, Agent, or Firm* — Schwegman Lundberg & Woessner, P.A.

(57) ABSTRACT

Systems and methods for presenting recommendations for resources to be used by members in learning about and/or acquiring a skill are described. In some example embodiments, the systems and methods receive information associated with a skill from a member of a social network, identify members of the social network that are associated with the skill, receive information from the identified members of the social network that identifies one or more resources associated with the skill, and generate a list of recommended resources that is based on the information received from the identified members of the social network.

28 Claims, 13 Drawing Sheets

(56) References Cited

U.S. PATENT DOCUMENTS

2014/0136613 A1\* 5/2014 Chandar .................. 709/204
2014/0181093 A1\* 6/2014 Buchmueller et al. ....... 707/723

\* cited by examiner

RECOMMENDING RESOURCES TO MEMBERS OF A SOCIAL NETWORK

CROSS REFERENCE TO RELATED APPLICATIONS

This application claims priority to U.S. Provisional Patent Application No. 61/806,341, filed on Mar. 28, 2013, entitled RECOMMENDING RESOURCES TO MEMBERS OF A SOCIAL NETWORK, which is hereby incorporated by reference in its entirety.

TECHNICAL FIELD

The present disclosure generally relates to providing recommendations using social network service information. More specifically, the present disclosure relates to methods, systems and computer program products for recommending resources to members of a social network.

BACKGROUND

Online social network services provide users with a mechanism for defining, and memorializing in a digital format, their relationships with other people. This digital representation of real-world relationships is frequently referred to as a social graph. Many social network services utilize a social graph to facilitate electronic communications and the sharing of information between its users or members. For instance, the relationship between two members of a social network service, as defined in the social graph of the social network service, may determine the access and sharing privileges that exist between the two members. As such, the social graph in use by a social network service may determine the manner in which two members of the social network service can interact with one another via the various communication and sharing mechanisms supported by the social network service.

Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

With many social network services, members are prompted to provide a variety of personal information, which may be displayed in a member's personal web page. Such information is commonly referred to as "personal profile information", or simply "profile information", and when shown collectively, it is commonly referred to as a member's profile. For example, with some of the many social network services in use today, the personal information that is commonly requested and displayed as part of a member's profile includes a member's age (e.g., birth date), gender, contact information, home town, address, the name of the member's spouse and/or family members, a photograph of the member, interests, and so forth. With certain social network services, such as some business network services, a member's personal information may include information commonly included in a professional resume or curriculum vitae, such as information about a person's education, employment history, job skills, professional organizations, and so forth. With some social network services, a member's profile may be viewable to the public by default, or alternatively, the member may specify that only some portion of the profile is to be public by default. As such, many social network services serve as a sort of directory of people to be searched and browsed.

DESCRIPTION OF THE DRAWINGS

Some embodiments of the technology are illustrated by way of example and not limitation in the figures of the accompanying drawings.

DETAILED DESCRIPTION

Overview

The present disclosure describes methods, systems, and computer program products, which individually provide functionality for recommending resources to members of a social network that enable the members to acquire desired skills. For example, the systems and methods described herein may present recommendations for resources to be used by members in learning about and/or acquiring a skill, among other things.

In some example embodiments, the systems and methods receive information associated with a skill from a member of a social network, identify members of the social network that are associated with the skill, receive information from the identified members of the social network that identifies one or more resources associated with the skill, and generate a list of recommended resources that is based on the information received from the identified members of the social network.

For example, components of a social network service may access information received from members of a social network that identifies resources associated with a skill and generate a user interface that presents a description of one or more of the identified resources that are associated with the skill, such as books, events, classes, groups, web-based content, and other resources.

Therefore, in some example embodiments, the systems and methods may leverage the vast knowledge contained within a social network service in order to identify resources that may assist a member in acquiring a skill, among other benefits.

In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Other advantages and aspects of the inventive subject matter will be readily apparent from the description of the figures that follows.

Suitable System

Figure 1:
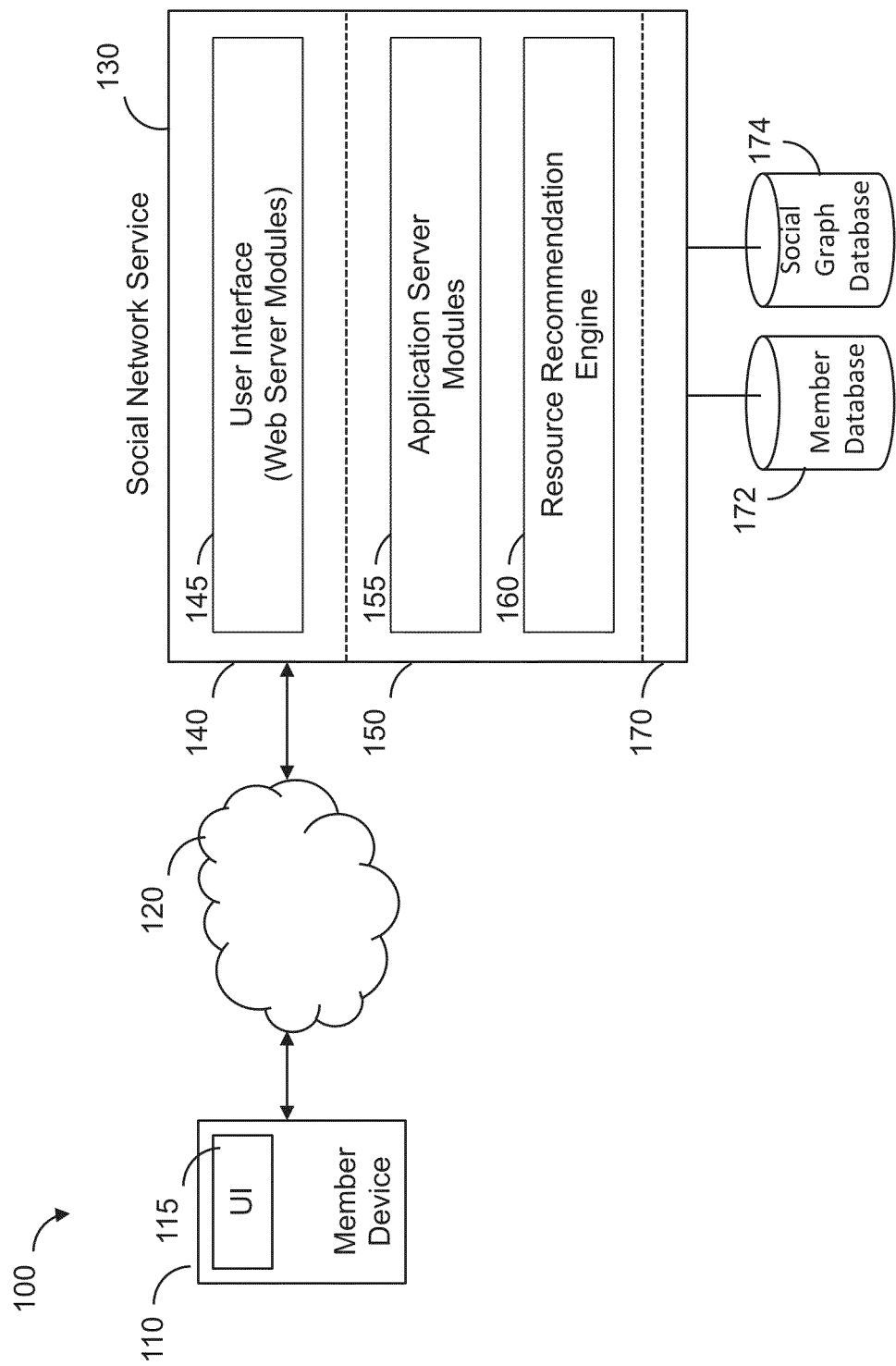
FIG. 1 is a block diagram illustrating various functional components of a suitable computing environment, consistent with some embodiments, for recommending resources to members of a social network.

FIG. 1 is a block diagram illustrating various functional components of a suitable computing environment 100, consistent with some embodiments, for providing recommendations to members of a social network.

As shown in FIG. 1, the computing environment 100 includes a social network service 130 that is generally based on a three-tiered architecture, consisting of a front-end layer 140, an application logic layer 150, and a data layer 170. The modules, systems, and/or engines shown in FIG. 1 represent a set of executable software instructions and the corresponding hardware (e.g., memory and processor) for executing the instructions. However, one skilled in the art will readily recognize that various additional functional modules and engines may be used with the social network service 130 to facilitate additional functionality that is not specifically described herein. Furthermore, the various functional modules and engines depicted in FIG. 1 may reside on a single server computer, or may be distributed across several server computers in various arrangements.

As shown in FIG. 1, the front end layer 140 includes a user interface module (e.g., a web server) 145, which receives requests from various client-computing devices, such as member device 110, over a network 120, and communicates appropriate responses to the requesting client devices. For example, the user interface module(s) 140 may receive requests in the form of Hypertext Transport Protocol (HTTP) requests, or other web-based, application programming interface (API) requests. The client devices 110 may be executing conventional web browser applications, or applications that have been developed for a specific platform to include any of a wide variety of mobile devices and operating systems.

The network 120 may be any communications network utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, wireless data networks (e.g., Wi-Fi® and WiMax® networks), and so on.

As shown in FIG. 1, the data layer 170 includes several databases, including databases for storing data for various entities of the social graph, such as a member database 172 of member profile information (e.g., information identifying attributes, skills, and other information for members), and a social graph database 174, which may include a particular type of database that uses graph structures with nodes, edges, and properties to represent and store data, such as social graph information. Of course, in some example embodiments, any number of other entities might be included in the social graph, and as such, various other databases may be used to store data corresponding with other entities.

In some example embodiments, when a person initially registers to become a member of a social network supported by the social network service 130, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, proficiencies, qualifications, professional organizations, and so on. This information is stored, for example, as member profile information or data in database 172.

Once registered, a member may invite other members, or be invited by other members, to connect via the social network service 130. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, a skill, or some other entity, which may or may not be included in the social graph.

The social network service 130 may provide a broad range of other applications and services that allow members the opportunity to share and receive information, often customized to the interests of the member. For example, in some example embodiments, the social network service 130 may include a photo sharing application that allows members to upload and share photos with other members. As such, a photograph may be a property or entity included within a social graph.

In some example embodiments, members of a social network service 130 may be able to self-organize into groups, or interest groups, organized around a subject matter or topic of interest. When a member joins a group, his or her membership in the group may be reflected in the social graph information stored in the social graph database 174. In some example embodiments, members may subscribe to or join groups affiliated with one or more companies. Thus, membership in a group, a subscription or following relationship with a company or group, as well as an employment relationship with a company, may all be examples of the different types of relationships that may exist between different entities, as defined by the social graph and modelled with the social graph information of the social graph database 174.

The application logic layer 150 includes various application server modules 155, which, in conjunction with the user interface module(s) 145, generates various user interfaces (e.g., web pages) with data retrieved from various data sources in the data layer 170. In some example some embodiments, individual application server modules 155 are used to implement the functionality associated with various applications, services and features of the social network service 130. For example, a messaging application, such as an email application, an instant messaging application, or some hybrid or variation of the two, may be implemented with one or more application server modules 155. Similarly, a search engine enabling users to search for and browse member profiles may be implemented with one or more application server modules 155.

In addition to the various application server modules 155, the application logic layer 150 also includes a resource recommendation engine 160 that presents recommended resources in response to receiving information identifying a skill or skills, such as information received from a member of the social network service 130 that identifies a skill desired by the member. Of course, other applications or services that utilize the resource recommendation engine 160 may be separately embodied in their own application server modules 155.

The resource recommendation engine 160 may perform one or more algorithmic processes that, in response to receiving input information associated with and/or identifying a skill (e.g., an attribute, a proficiency, a characteristics, an ability, a qualification, and so on), identify members of the social network service 130 that are associated with the skill (e.g., members having attributes related to or associated with the skill), receive recommendations for resources (e.g., books, events, web-based content, and so on) from the identified members, and generates a list or collection of the resource recommendations, which may be presented in various configurations via user interfaces provided by the social network service 130.

As illustrated in FIG. 1, in some example embodiments, the resource recommendation engine 160 is implemented as a service that operates in conjunction with various application server modules 155. For instance, any number of individual application server modules 155 may invoke the functionality of the resource recommendation engine 160, to include an application server module associated with receiving information from the member device 110 and/or an application server module associated with an application to facilitate the viewing of user interfaces presenting resource recommendations. However, in some example embodiments, the resource recommendation engine 160 may be implemented as its own application server module such that it operates as a stand-alone application or system.

In some example embodiments, the resource recommendation engine 160 may include or have an associated publicly available Application Programming Interface (API) that enables third-party applications or other applications, algorithms or scripts within the social network service 130 to invoke the functionality of the resource recommendation engine 160, among other things.

Thus, in some example embodiments, the resource recommendation engine 160, either provided by or in collaboration with the social network service 130, receives a skill as input, leverages information stored by the social network service 130 (e.g., information stored in member database 172) and outputs recommendations that identify resources that may be useful in assisting a member (or other user or viewer) to acquire the skill, among other things.

Examples for Recommending Resources to Members of a Social Network

Figure 2:
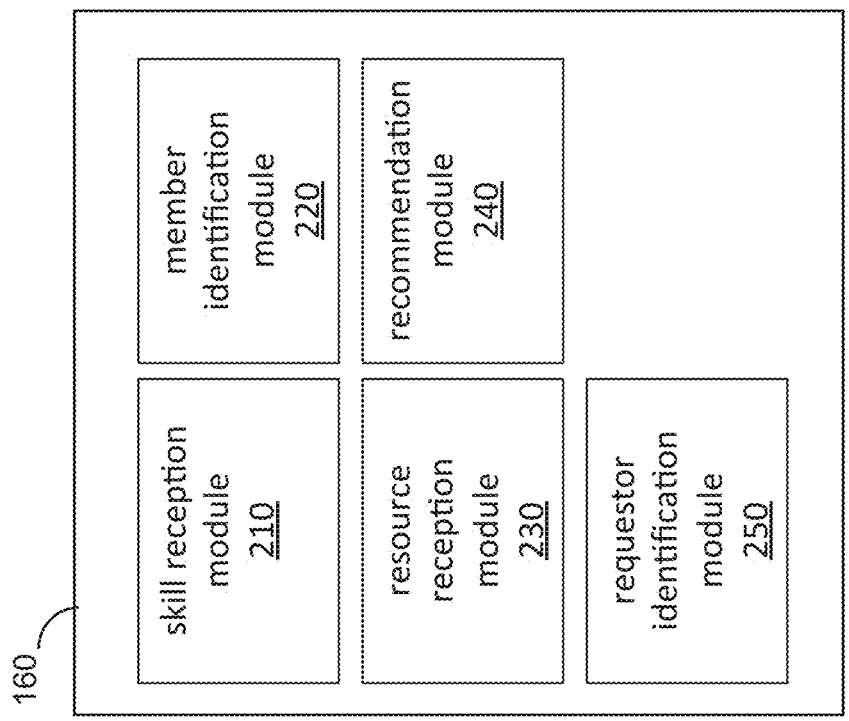
FIG. 2 is a block diagram illustrating example modules of a resource recommendation engine, consistent with some embodiments.

As described herein, in some example embodiments, the resource recommendation engine 160 presents recommendations for resources associated with a skill and identified by members of the social network. FIG. 2 is a block diagram illustrating modules of the resource recommendation engine 160, consistent with some embodiments.

As illustrated in FIG. 2, the resource recommendation engine 160 includes a variety of functional modules. One skilled in the art will appreciate that the functional modules are implemented with a combination of software (e.g., executable instructions, or computer code) and hardware (e.g., at least a memory and processor). Accordingly, as used herein, in some example embodiments a module is a processor-implemented module and represents a computing device having a processor that is at least temporarily configured and/or programmed by executable instructions stored in memory to perform one or more of the particular functions that are described herein.

Referring to FIG. 2, the resource recommendation engine 160 includes a skill reception module 210, a member identification 220, a resource reception module 230, a recommendation module 240, and a requestor identification module 250.

In some example embodiments, the skill reception module 210 is configured and/or programmed to receive information identifying a skill from a member of a social network. For example, the skill reception module 210 may receive and/or access information that is input by a member of the social network.

The received and or accessed input may be any type of information that identifies a skill provided to the resource recommendation engine 160. Examples of information identifying a skill include information identifying a job title (e.g., "CEO" or "Publisher"), information identifying an occupation (e.g., "Actor"), information identifying desired job tasks (e.g., "write source code"), information identifying an industry (e.g., "computer software" or "education"), information identifying a university or degree (e.g., "Master's degree in Physics"), information identifying a life goal ("a Philanthropist"), information identifying a proficiency (e.g., "Hadoop" or "C++"), information identifying a qualification (e.g., "CPA"), information identifying an ability ("run 100 miles" or "build webpages"), combinations thereof, and so on. Thus, the received input may be information identifying a specific skill (e.g., "Hadoop" or "roofing") and/or information identifying a general or broad skill (e.g., "programming" or "carpentry"), among other things.

The skill reception module 210 may also monitor activities associated with the member or connections to the member that are performed within the social network, and extract the skill from the monitored activities. For example, the skill reception module 210 may monitor member profile information, searches performed by members, content generated and/or viewed by members, and so on, and extract information identifying skills from the various types of monitored information.

In some example embodiments, the skill reception module 210 may identify a skill by detecting that a member is viewing a web page associated with the skill, by detecting that a member interacts with a web page describing a job opportunity associated with the skill, and/or that a member responds to a recommendation to acquire the skill.

In some example embodiments, the member identification module 220 is configured and/or programmed to identify members of the social network that are associated with the skill. For example, the member identification module 220 may identify members of the social network based on profile information (e.g., attributes) associated with the members of the social network, based on activities (e.g., posts, views, searches, and so on) performed by the members of the social network, based on recommendations or endorsements of the members by other members of the social network, and so on. The member identification module 220 may query various databases of the social network service 130, such as the member database 172, in order to identify members associated with the skill.

Therefore, the member identification module 220 may utilize various different algorithmic processes to identify members of a social network that are associated with skill information, including processes that compare attributes of the members to the skill, among other things. In addition, the member identification module 220 may compute a metric of a member's expertise, authority, or reputation with respect to a skill.

In some example embodiments, the resource reception module 230 is configured and/or programmed to receive information from the identified members of the social network that identify one or more resources associated with the skill. For example, the resource reception module 230 may present a user interface to the identified members, which facilitates reception of information identifying the resources associated with the skill.

As described herein, the resource recommendation engine 160 may receive information from members that identifies various types of resources. Example resource types include books and other media (e.g., video, audio, presentations, webpages, and so on), classes and other instructional programs, events (e.g., conferences, seminars, programs, plays, concerts, readings, lectures, and so on), webpages and other online content (e.g., blogs, articles, and so on), groups and organizations, instructors and mentors, downloadable applications, games, and so on. Thus, the resource reception module 230 may receive information identifying a resource or asset that is associated with a skill and assists in a person learning about, obtaining information about, gaining proficiency or expertise in, obtaining credentials in, and/or acquiring the skill or related skills, among other things.

In some example embodiments, the recommendation module 240 is configured and/or programmed to generate a list of recommended resources that is based on the information received from the identified members of the social network. For example, the recommendation module 240 may generate a user interface that presents information identifying the recommended resources.

As described herein, the recommendation module 240 may generate, render, present, and/or display various different configurations of resource recommendations, such as ranked lists, as well as various interactive and display elements that accompany the resource recommendations.

For example, the recommendation module 240 may generate a user interface that includes:

Information identifying the resource and information identifying a member of the social network that identified the resource;

Information identifying the resource, information identifying a member of the social network that identified the resource, and information identifying other members of the social network that have endorsed the resource;

Information identifying the resource and an actionable button that facilitates acquisition of the resource by the member of the social network; and/or Information identifying the resource and an actionable element that enables viewers of the user interface to provide feedback associated with the resource.

In some example embodiments, the recommendation module 240 may apply various filters, which may enable presentation of a list of resources of a single type (e.g., a list of only books or events) or a list containing resources of two or more types, among other things.

In some cases, a resource may be associated with a specific time frame. For example, an event may be scheduled at a particular date and time and/or technical course may be scheduled to begin on a specified date and end on a later specified date. The recommendation module 240 may apply a temporal filter, for example, to exclude events scheduled in the past, and/or to include only events scheduled within a time range specified by the user.

In some cases, a resource may be associated with other attributes that affect its suitability for a particular member. For example, an event may occur in a specific location, or a class may be available only to students admitted to or currently attending a specific educational institution, among other things.

The recommendation module 240 may rank and/or order the resource recommendations based on a variety of different factors. For example, the recommendation module 240 may rank recommended resources based on endorsements of the resources by members of the social network and/or based on attributes associated with members of the social network that identified the resources. In some example embodiments, the recommendation module 240 may assign to an endorsement of a resource by a member a weight based on a metric of the member's expertise in the relevant skill, and/or may assign to a resource a score based on the sum of the weights of the endorsers. The recommendation module 240 may then generate, render, display, and/or present a user interface that presents descriptions of the recommended resources according to the rankings.

In some example embodiments, a member may choose to provide negative feedback on a resource, with the member's feedback contributing negatively to the score assigned to the resource. The member may provide negative feedback for various reasons, such as: the resource is not relevant to the skill, the resource is of poor quality, the resource is suspected spam or was uploaded due to abuse of the social network service, the resource is no longer available, the resource is not accessible at the specified URL, and so on. The recommendation module 240 may apply a filter to exclude resources that have received negative feedback, and/or to exclude resources having scores below a threshold. Thus, the collective expertise of the member community can be used to curate the resource collection, and maintain its quality and relevance over time.

In some example embodiments, the requestor identification module 250 is configured and/or programmed to receive and/or access information characterizing a requesting member (e.g., a requestor or a member that input the skill). For example, the requestor identification module 250 may receive information identifying certain characteristics of the requesting member (e.g., age, location, title, and so on). The recommendation module 240, in some example embodiments, may then generate a list of recommended resources that is based on the information characterizing the member of the social network. For example, the recommendation module 240 may generate a list of recommended resources that includes events to be held in a location at which the requestor lives or webpages associated with people followed by the requestor, among other things.

Figure 3:
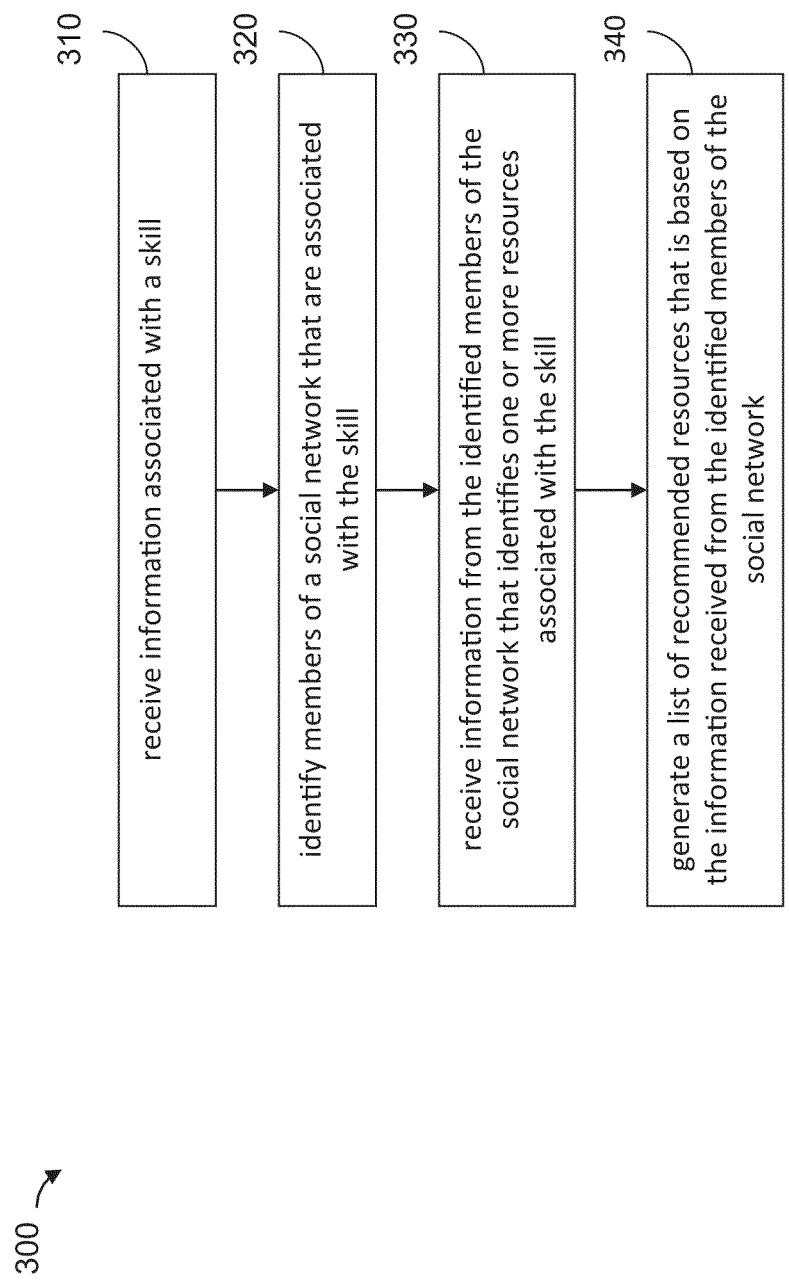
FIG. 3 is a flow diagram illustrating an example method for recommending resources associated with a skill, consistent with some embodiments.

As described herein, the resource recommendation engine 160 may perform various methods in order to recommend resources associated with a skill to be acquired by a member of a social network. FIG. 3 is a flow diagram illustrating an example method 300 for recommending resources associated with a skill, consistent with some embodiments. The method 300 may be performed by the resource recommendation engine 160 and, accordingly, is described herein merely by way of reference thereto. It will be appreciated that the method 300 may be performed on any suitable hardware.

In operation 310, the resource recommendation engine 160 receives information associated with a skill from a member of a social network. For example, the skill reception module 210 may receive input identifying a skill from a member of a social network.

Figure 4A:
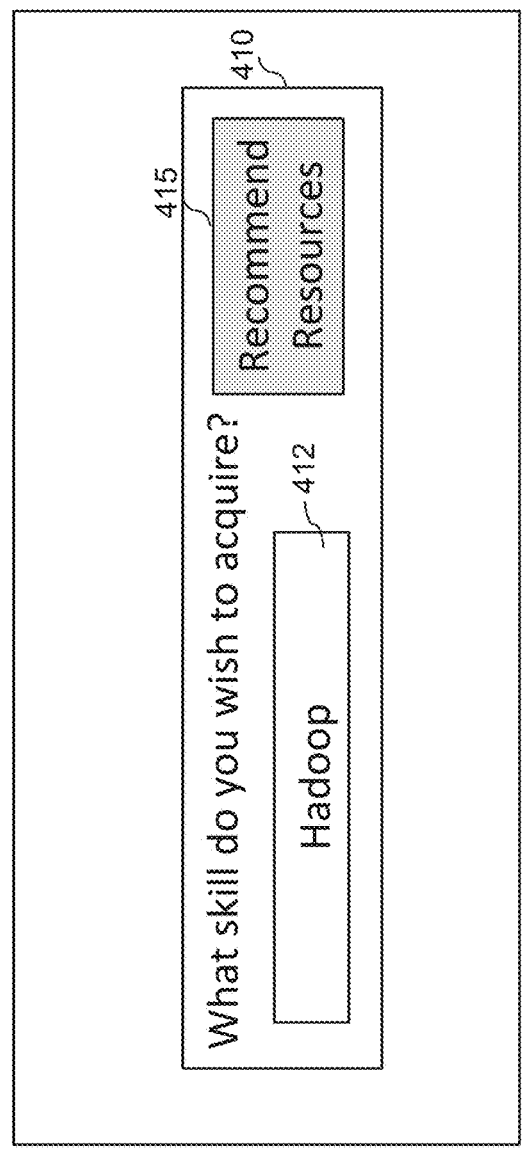
FIGS. 4A and 4B are display diagrams illustrating user interfaces provided by the resource recommendation engine to receive information associated with a skill, consistent with some embodiments.
Figure 4B:
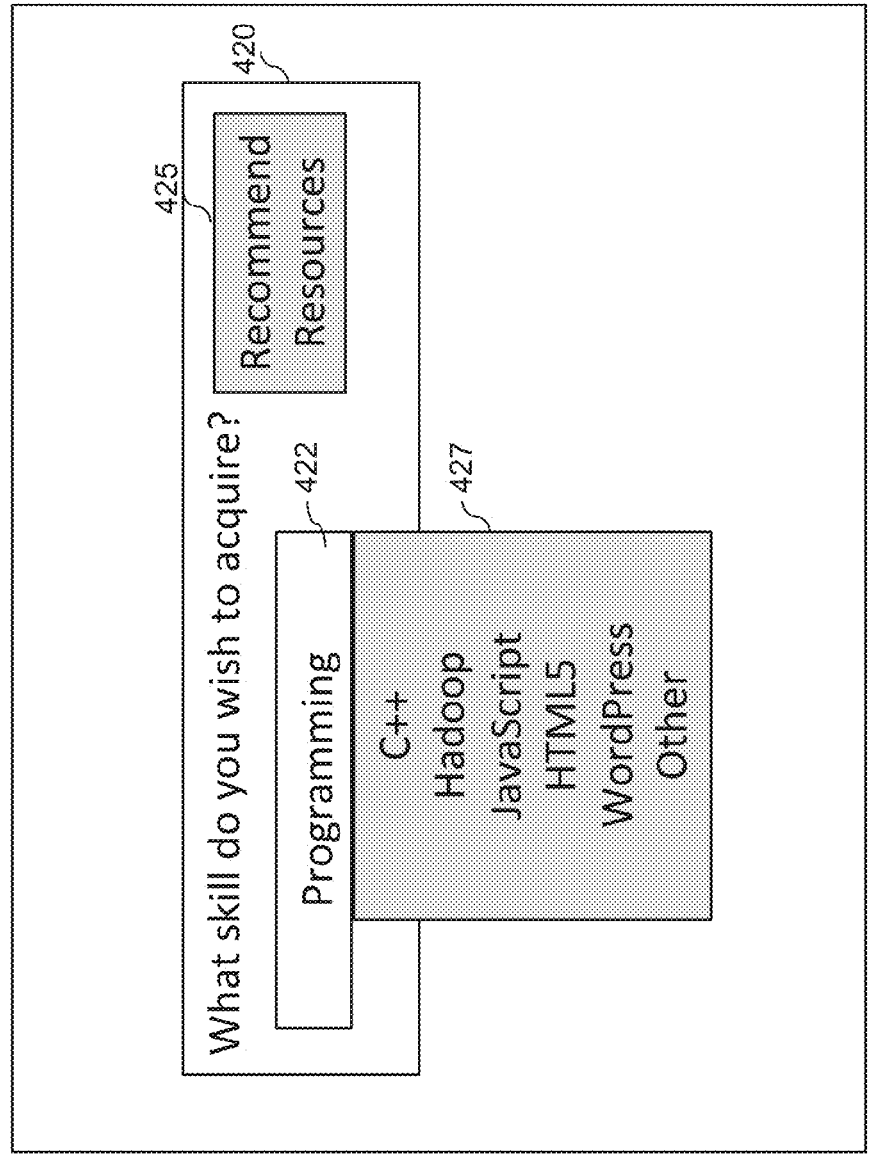

As described herein, in some example embodiments, the skill reception module 210 may present and/or receive information via a user interface configured to receive input from the member of the social network. FIGS. 4A and 4B are display diagrams illustrating user interfaces provided by the resource recommendation engine to receive information associated with a skill, consistent with some embodiments.

For example, FIG. 4A depicts a user interface 400 that is configured to receive input associated with a skill from a member of a social network or other user. The user interface 400 includes a graphical element 410 that includes an input box 412 configured to receive text-based input from a user that identifies a skill (e.g., "Hadoop"), and an actionable button 415 configured to be selected by the user in order to provide the input to the resource recommendation engine 160.

As another example, FIG. 4B depicts a user interface 420 that is configured to receive input associated with a skill from a member of a social network or other user. The user interface 420 includes a graphical element 420 that includes an input box 422 configured to receive text-based input from a user that identifies a skill (e.g., "programming"), a drop-down menu 427 that provides user-selectable options, such as related skills, and an actionable button 425 configured to be selected by the user in order to provide the input to the resource recommendation engine 160. For example, the user interface 420 may receive via the input box 422 a information identifying a skill of "programming," and present via the drop-down menu 427 various user-selectable options associated with the skill, such as "C++," "Hadoop," "Word-Press," and so on.

Referring back to FIG. 3, in operation 320, the resource recommendation engine 160 identifies members of the social network that are associated with the skill. For example, the member identification module 220 may identify members of the social network based on profile information (e.g., attributes) associated with the members of the social network, based on activities (e.g., posts, views, searches, and so on) performed by the members of the social network, and so on.

In operation 330, the resource recommendation engine 160 receives information from the identified members of the social network that identifies one or more resources associated with the skill. For example, the resource reception module 230 may receive information identifying a book, event, webpage, or other resources.

Figure 5:
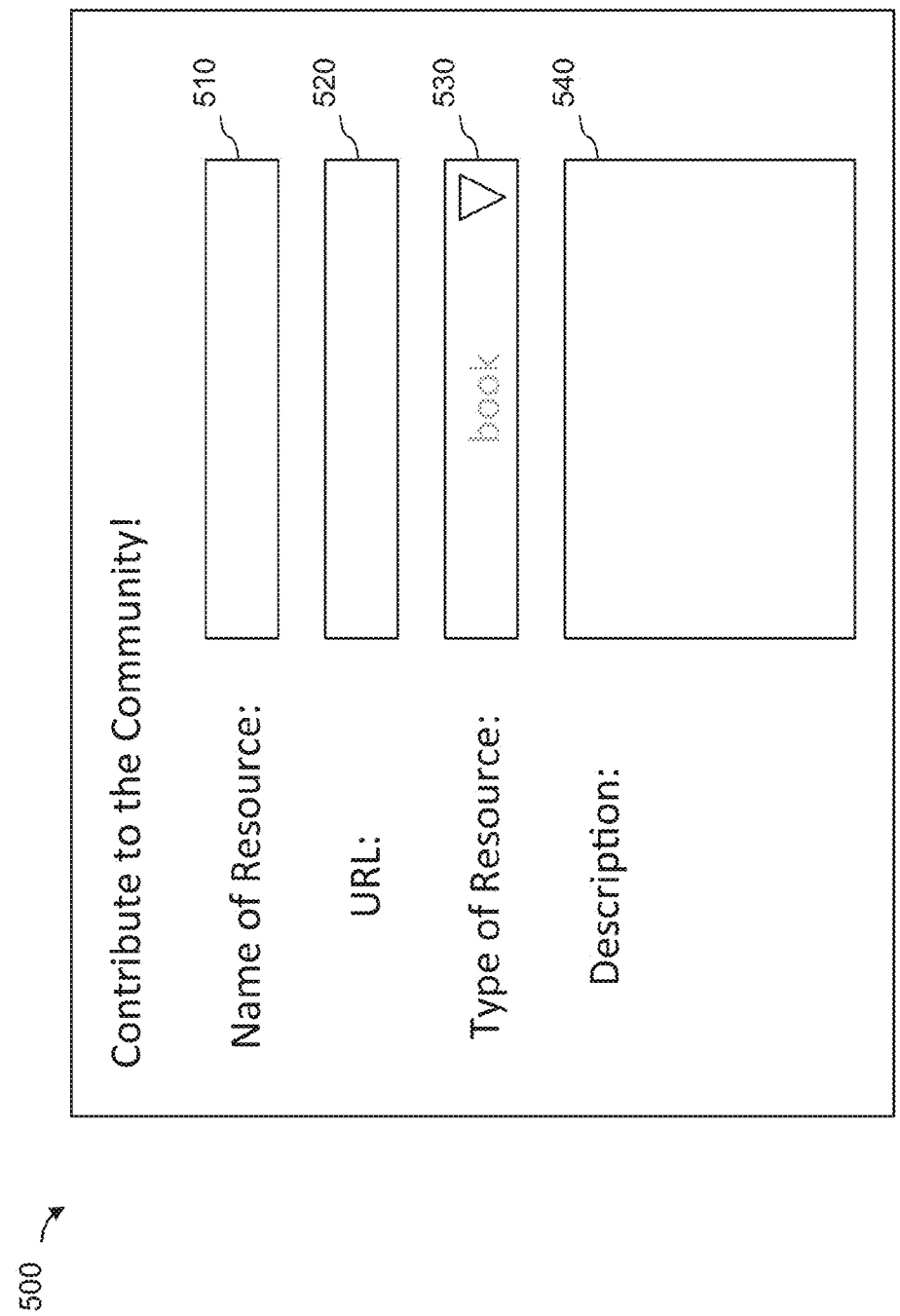
FIG. 5 is a display diagram illustrating a user interface provided by the resource recommendation engine to receive information from members of a social network that identifies resources associated with a skill, consistent with some embodiments.

As described herein, in some example embodiments, the resource reception module 230 may present and/or receive information via a user interface configured to receive information that identifies resources from members of the social network service 130. FIG. 5 is a display diagram illustrating a user interface 500 that receives information from members of a social network that identify resources associated with a skill, consistent with some embodiments.

The user interface 500 includes various text-based input boxes and/or drop-down menus configured to receive information associated with a resource to be recommended, such as input boxes and/or drop-down menus that receive information associated with the name of a resource, information associated with a URL or other location for the resource, information associated with the type of resource, information describing the resource, and so on. In some example embodiments, the user interface 500 may include additional input elements that receive information associated with other attributes of a resource, such as the date, time, and/or location of an event, among other things.

In some example embodiments, the resource reception module 230 may present and/or receive information via a user interface displayed by or embedded within an external web site or application provided by a third party. For example, the user interface may include an actionable element to associate a resource (e.g., a book, a class, and so on) provided by the third party with one or more skills. The user interface may also include input elements configured to receive other information associated with the resource.

Figure 6A:
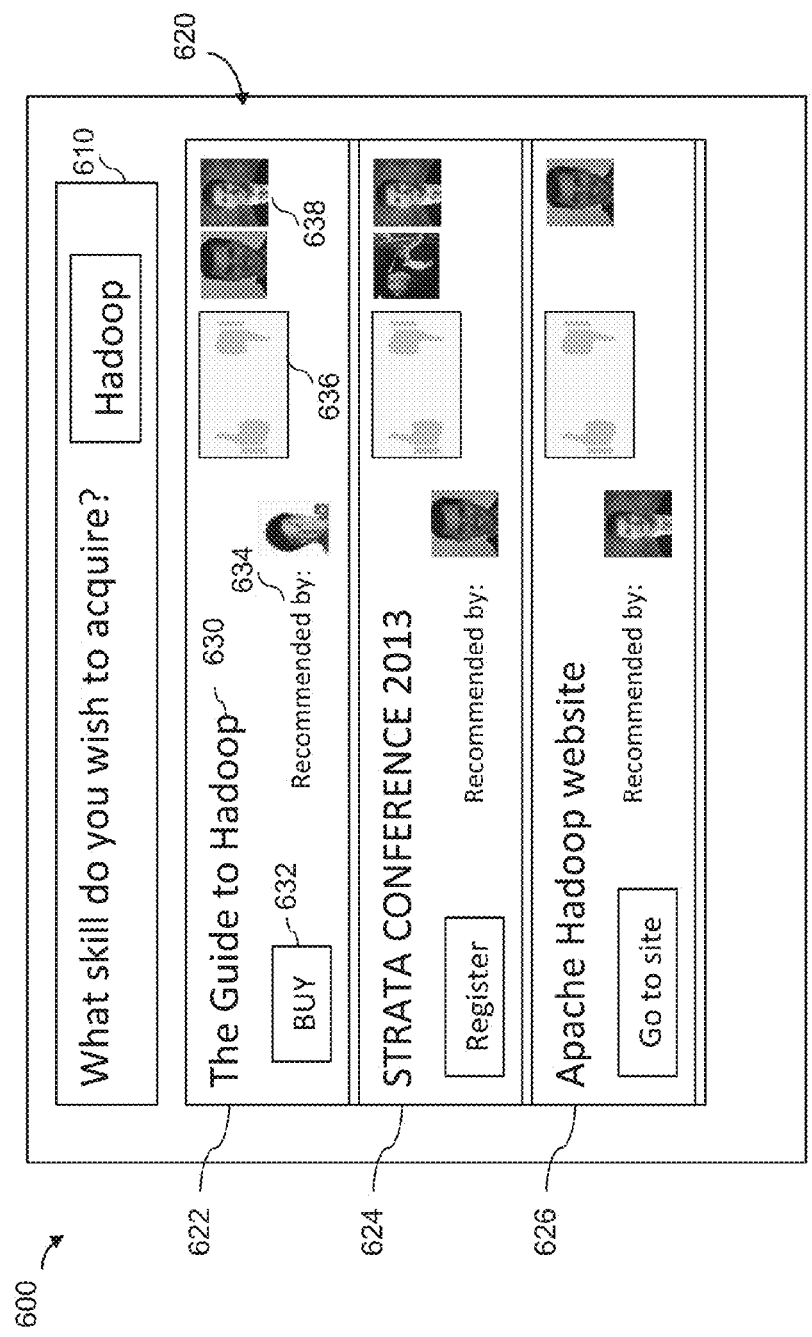
FIGS. 6A and 6B are display diagrams illustrating user interfaces presenting resource recommendations, consistent with some embodiments.
Figure 6B:
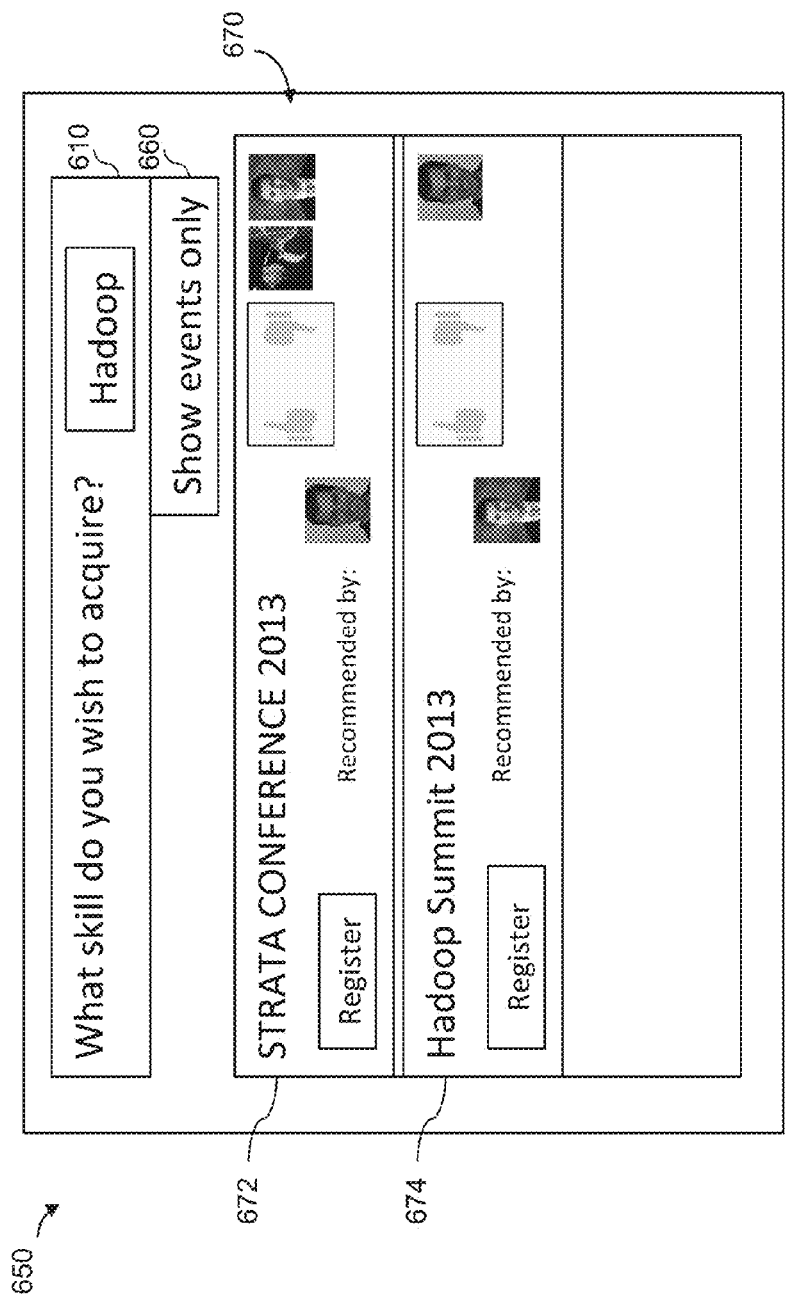

Referring back to FIG. 3, in operation 340, the resource recommendation engine 160 generates a list of recommended resources that is based on the information received from the identified members of the social network. For example, the recommendation module 240 may generate a user interface that presents information identifying the recommended resources, such as one or more user interfaces that display various different configurations of resource recommendations, such as ranked lists, as well as various interactive and display elements that accompany the resource recommendations. FIGS. 6A and 6B are display diagrams illustrating user interfaces presenting resource recommendations, consistent with some embodiments.

For example, FIG. 6A depicts a user interface 600 that presents various resource recommendations 620 associated with input 610 identifying a skill of "Hadoop." The recommendations include a recommendation 622 for a book entitled "The Guide to Hadoop," a recommendation 624 for an event entitled "Strata Conference 2013," and a recommendation 626 for a website entitled "Apache Hadoop."

As described herein, the user interface 600 presents information along with the presented resource recommendations, such as information 634 identifying members that provided a resource recommendation and information 638 that identifies other members of the social network that have endorsed the resource recommendation, among other things. Additionally, the user interface 600 presents actionable buttons along with the presented resource recommendations, such as an actionable button 632 associated with performing an action to obtain the resource (e.g., "buy" a book, or "register" for a conference) and an actionable button 636 that receives feedback from other members of the social network (e.g., "likes" and "dislikes") that is associated with the relevance, quality, and/or appropriateness of the resources.

As another example, FIG. 6B depicts a user interface 650 that presents a filtered list of resource recommendations 670 associated with input 660 identifying a skill of "Hadoop."

The user interface 650 includes a user-selectable filter 660 (e.g., selected to "show events only"). Based on the filter selection, the filtered list includes a recommendation 672 for a conference entitled "Strata Conference 2013," a recommendation 674 for an event entitled "Hadoop Summit 2013." The user interface 650 also includes accompanying information and actionable buttons, as described herein.

As described herein, in some example embodiments, the resource recommendation engine 160 includes the requestor identification module 250, which receives information identifying certain characteristics of a requesting member (e.g., age, location, title, and so on), enabling the recommendation module 240 to generate a list of recommended resources tuned to the requesting member, among other things.

Figure 7:
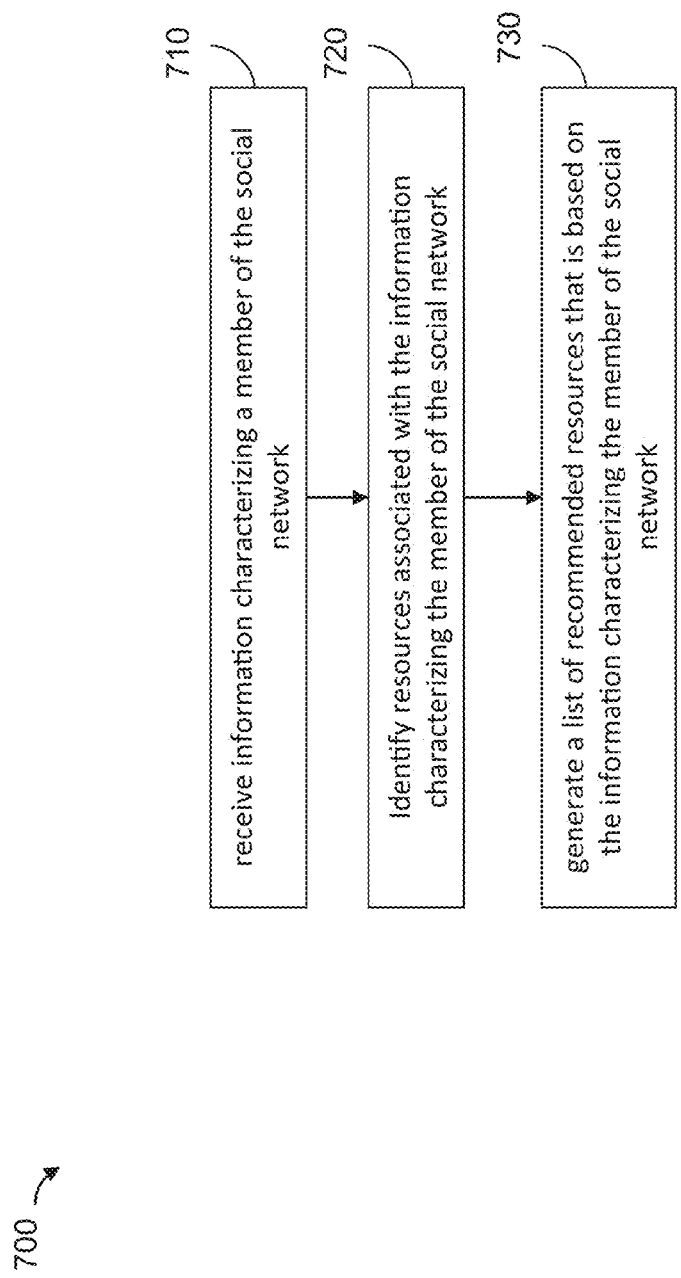
FIG. 7 is a flow diagram illustrating an example method for generating a list of resource recommendations based on information characterizing a requesting member, consistent with some embodiments.

FIG. 7 is a flow diagram illustrating an example method 700 for generating a list of resource recommendations based on information characterizing a requesting member, consistent with some embodiments. The method 700 may be performed by the resource recommendation engine 160 and, accordingly, is described herein merely by way of reference thereto. It will be appreciated that the method 700 may be performed on any suitable hardware.

In operation 710, the resource recommendation engine 160, e.g., via the requestor identification module 250, receives information characterizing a member of the social network, such as information identifying an age, location, or other characteristics of a member requesting recommendations for resources associated with a skill to be acquired by the requesting member.

In operation 720, the resource recommendation engine 160, via the recommendation module 240, identifies and/or selects resources associated with the information characterizing the member of the social network, such as resources associated with the age or location of the requesting member.

Figure 8:
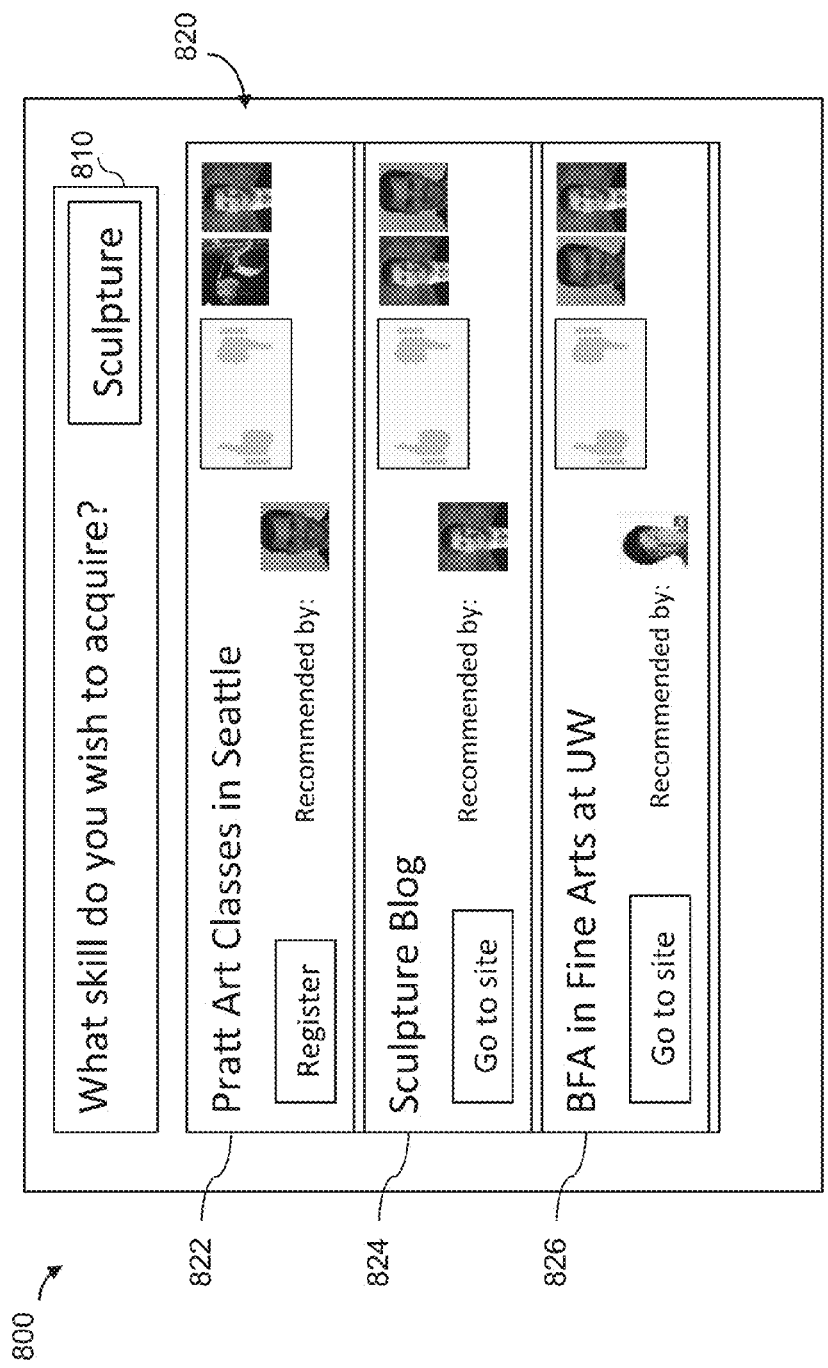
FIG. 8 is a display diagram illustrating a user interface presenting resource recommendations based on characteristics of a requesting member, consistent with some embodiments.

In operation 730, the resource recommendation engine 160, via the recommendation module 240, generates a list of recommended resources that is based on the information characterizing the member of the social network. FIG. 8 is a display diagram illustrating a user interface 800 presenting resource recommendations based on characteristics of a requesting member, consistent with some embodiments.

As shown in FIG. 8, the user interface 800 presents resource recommendations 820 associated with input 810 identifying a skill of "sculpture" that was received from a member located in Seattle. For example, the resource recommendations 820 include recommendations tuned to the member's location of Seattle, including a recommendation 822 for art classes in Seattle and a recommendation 826 for a Fine Arts degree program at the University of Washington, as well as other global recommendations, including a recommendation 824 for a blog on sculpture practices.

Figure 9:
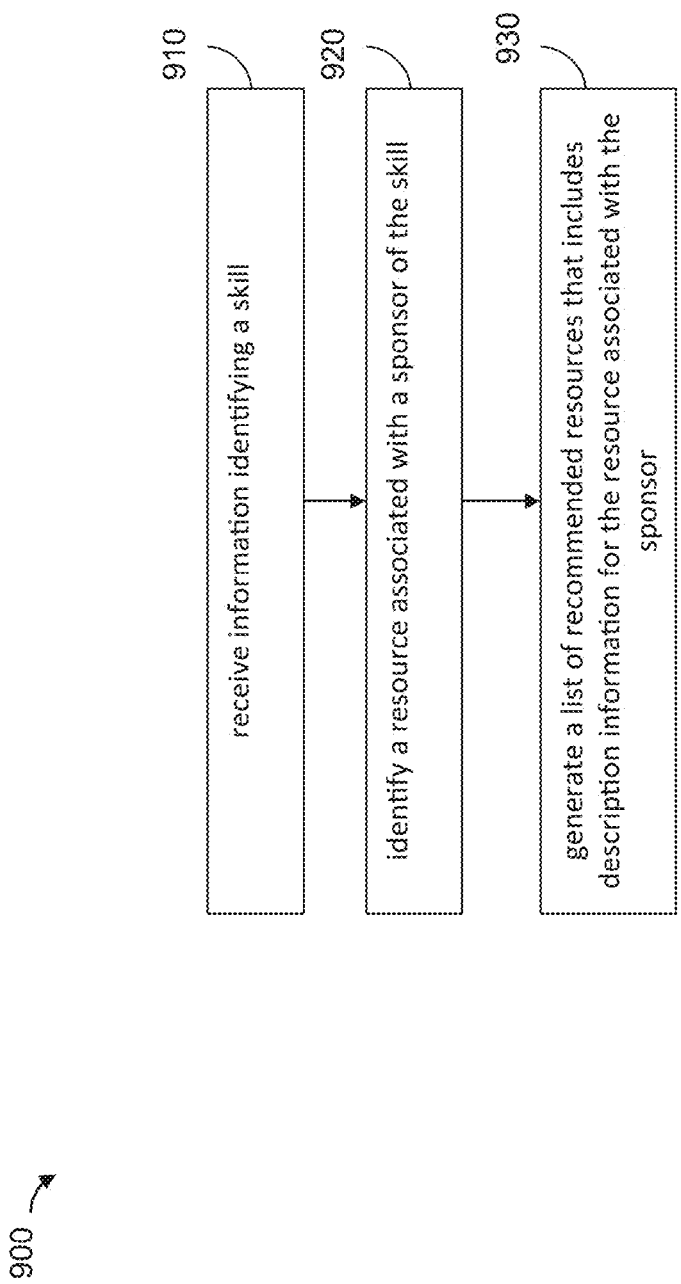
FIG. 9 is a flow diagram illustrating an example method for generating a list of resource recommendations that includes sponsored content, consistent with some embodiments.

As described herein, the resource recommendation engine 160 may present sponsored resource recommendations within a list of presented resource recommendations, such as by enabling corporations and other entities to sponsor a skill, generic resource recommendations, and so on. FIG. 9 is a flow diagram illustrating an example method 900 for generating a list of resource recommendations that includes sponsored content, consistent with some embodiments.

In operation 910, the resource recommendation engine 160, e.g., via the skill reception module 210, receives information identifying a skill. In operation 920, the resource recommendation engine 160, e.g., via the recommendation engine 240, identifies resource associated with a sponsor of the skill, such as a resource provided by the sponsor of the skill (e.g., a book published by the sponsor or a course provided by the sponsor). In operation 930, the resource recommendation engine 160, e.g., via the recommendation module 240, generates a list of recommended resources that includes description information for the resource associated with the sponsor of the skill.

Figure 10:
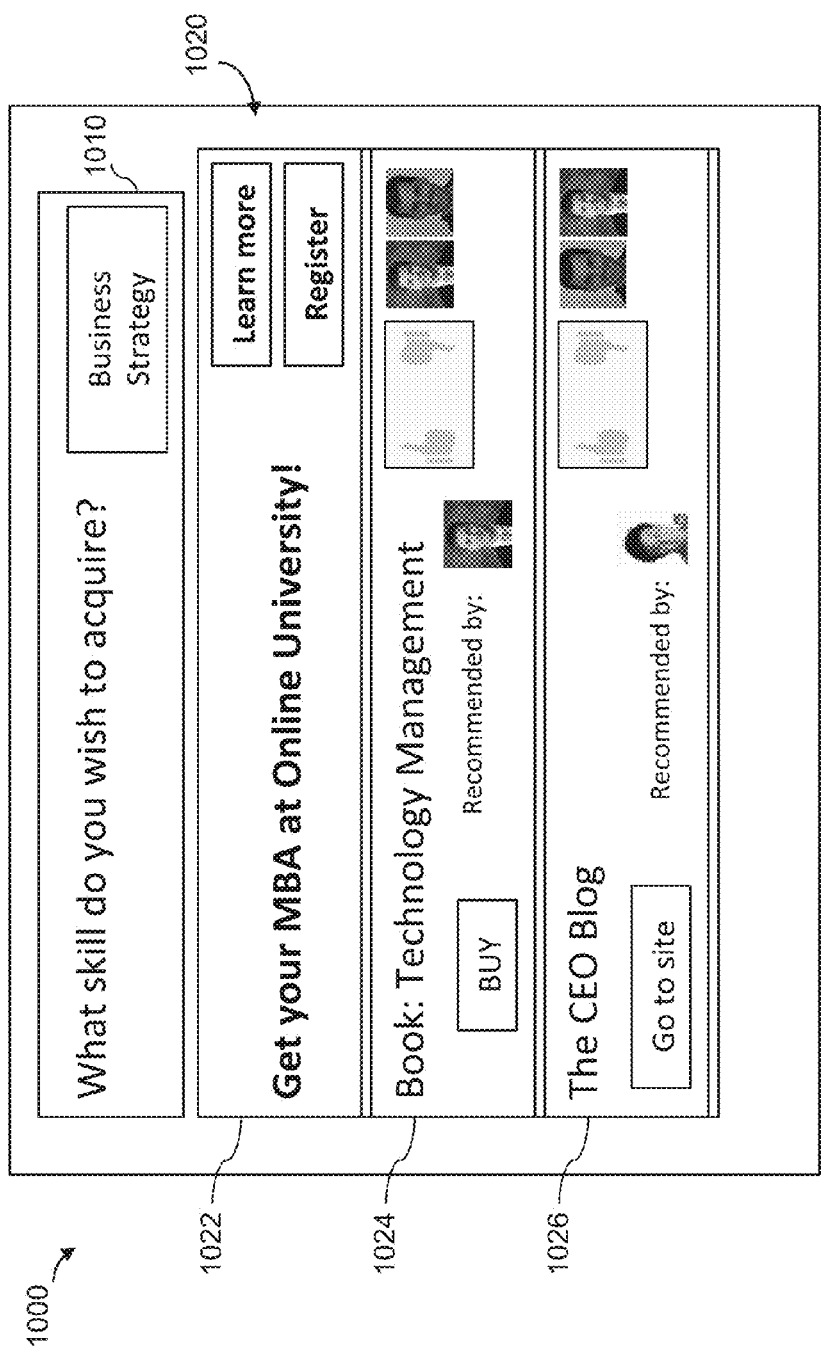
FIG. 10 is a display diagram illustrating a user interface presenting resource recommendations that include sponsored recommendations, consistent with some embodiments.

For example, FIG. 10 is a display diagram illustrating a user interface 1000 presenting resource recommendations that include sponsored recommendations, consistent with some embodiments. The user interface 1000 presents resource recommendations 1020 associated with input 1010 identifying a skill of "Business Strategy" that was received from a member of the social network, including a sponsored recommendation 1022 for courses at "Online University," and non-sponsored recommendations 1024 and 1026, for a book entitled "Technology Management" and web content entitled "The CEO Blog," respectively.

Therefore, in some example embodiments, the resource recommendation engine may facilitate a cost-per-engagement revenue model by enabling entities to sponsors various skills, among other things. Thus, the resource recommendation engine 160 may access information received from members of a social network that identifies resources associated with a skill, and in response to receiving a request from a requesting member of the social network to provide information about the skill, generate a user interface that presents a description of one or more of the identified resources that are associated with the skill, such as one or more of the user interfaces described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 11:
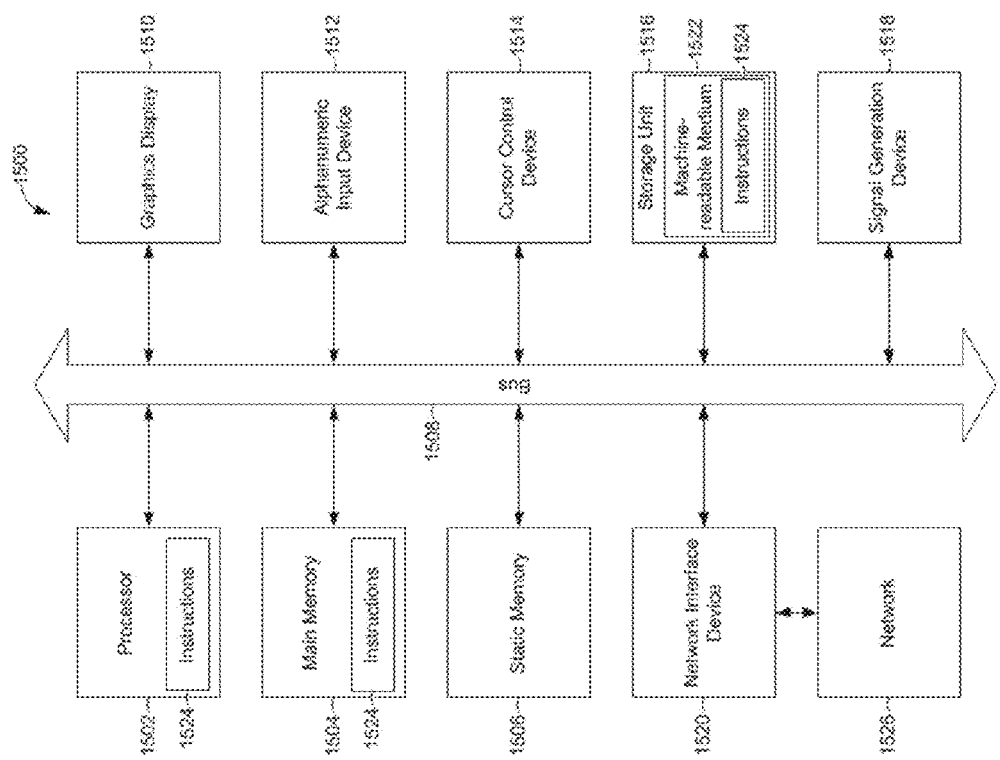
FIG. 11 is a block diagram of a machine in the form of a computing device within which a set of instructions, for causing the machine to perform any one or more of the methodologies discussed herein, may be executed.

FIG. 11 is a block diagram of a machine in the form of a computer system or computing device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some embodiments, the machine will be a desktop computer, or server computer, however, in alternative embodiments, the machine may be a tablet computer, a mobile phone, a personal digital assistant, a personal audio or video player, a global positioning device, a set-top box, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a display unit 1510, an alphanumeric input device 1512 (e.g., a keyboard), and a user interface (UI) navigation device 1514 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors, such as a global positioning system sensor, compass, accelerometer, or other sensor.

The drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1524 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although some embodiments has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method, comprising:
    receiving skill information from a member device of an online social network;
    identifying member identification information of the online social network that is associated with the skill information;
    receiving resource information associated with the identified member identification information of the online social network that identifies one or more resources associated with the skill information;
    generating a list of recommended resources that is based on the resource information associated with the member identification information of the online social network;
    determining a ranking for each of the recommended resources, wherein the ranking is based on attribute information associated with the member identification information of the online social network identifying the resource, wherein the member identification attribute information includes a location, and further wherein the ranking is based on attribute information of the member device including location of the member device; and
    generating the list of recommended resources based on the determined rankings; wherein identifying member identification information of the online social network that is associated with the skill information includes identifying member identification information of the online social network based on profile information associated with the member identification information of the online social network.

2. The method of claim 1, wherein receiving the skill information from the member device of the online social network includes receiving information identifying proficiency information or ability information not currently associated with the member identification information of the online social network;
    wherein identifying the member identification information of the online social network that is associated with the skill information includes identifying member identification information of the online social network that has attribute information associated with the identified proficiency information or ability information; and
    wherein generating a list of recommended resources that is based on the resource information associated with the member identification information of the online social network includes generating a list that includes information identifying books, events, classes, groups, or webpages based on the resource information associated with the member identification information of the online social network that has attribute information associated with the identified proficiency information or ability information.

3. The method of claim 1, wherein generating a list of recommended resources that is based on the resource information associated with the member identification information of the online social network includes:
  determining a ranking for each of the recommended resources, wherein the ranking is based on endorsement information of the recommended resources associated with the member identification information of the online social network; and
  generating the list of recommended resources based on the determined rankings.

4. The method of claim 1, wherein generating a list of recommended resources that is based on the resource information associated with the member identification information of the online social network includes:
  determining a score for each of the recommended resources, wherein the score is based on expertise information associated with the member identification information of the online social network associated with the resource; and
  generating the list of recommended resources based on the determined scores.

5. The method of claim 1, wherein receiving the skill information includes receiving input identifying the skill information from the member device of the online social network.

6. The method of claim 1, wherein receiving the skill information includes:
  monitoring activity information associated with the member identification information or connection information associated with the member identification information; and
  extracting the skill information from the monitored activity information.

7. The method of claim 1, wherein identifying member identification information of the online social network that is associated with the skill information includes identifying the member identification information of the online social network based on activity information.

8. The method of claim 1, further comprising:
  presenting a user interface that facilitates reception of information identifying the resources associated with the skill information.

9. The method of claim 1, wherein receiving the resource information that identifies one or more resources associated with the skill information includes receiving information identifying a book, an event, a class, a group, or a webpage that is associated with the skill information.

10. The method of claim 1, wherein generating a list of recommended resources that is based on the resource information includes generating a user interface that presents information identifying the recommended resources;
  wherein the user interface presents, for each of the identified recommended resources, information identifying the resource and information identifying the member identification information of the online social network associated with the resource.

11. The method of claim 1, wherein generating a list of recommended resources that is based on the resource information includes generating a user interface that presents information identifying the recommended resources;
  wherein the user interface presents, for each of the identified recommended resources, information identifying the resource, information identifying member identification information of the online social network associated with the resource, and information identifying other member identification information of the online social network and associated endorsement information.

12. The method of claim 1, wherein generating a list of recommended resources that is based on the resource information includes generating a user interface that presents information identifying the recommended resources;
  wherein the user interface presents, for each of the identified recommended resources, information identifying the resource and an actionable button that facilitates acquisition of the resource.

13. The method of claim 1, wherein generating a list of recommended resources that is based on the resource information includes generating a user interface that presents information identifying the recommended resources;
  wherein the user interface presents, for each of the identified recommended resources, information identifying the resource and an actionable element that enables feedback associated with the resource.

14. The method of claim 1, wherein generating a list of recommended resources that is based on the resource information includes generating a list of a single resource type.

15. The method of claim 1, wherein generating a list of recommended resources that is based on the resource information includes generating a list having at least two or more resource types.

16. The method of claim 1, further comprising:
  receiving information characterizing the member device of the online social network;
  wherein generating a list of recommended resources that is based on the resource information includes generating a list of recommended resources that is based on the information characterizing the member device of the online social network.

17. A system, comprising:
  a skill reception processor that is configured to receive skill information associated with a member device of an online social network;
  a member identification processor that is configured to identify member identification information of the social network that is associated with the skill information;
  a resource reception processor that is configured to receive information that identifies one or more resources associated with the skill information;
  a ranking processor that is configured to determine a ranking for each of the resources, wherein the ranking is based on attribute information associated with member identification information of the social network identifying the resource, wherein the member identification attribute information includes a location, and further wherein the ranking is based on attribute information of the member device including location of the member device; and
  a recommendation processor that is configured to generate a list of recommended resources that is based on the member identification information and based on the determined rankings;
  wherein the member identification processor identifies member identification information of the online social network that is associated with the skill information by identifying member identification information of the online social network based on profile information associated with the member identification information of the online social network.

18. The system of claim 17, wherein the skill reception processor is configured to receive information identifying proficiency information or ability information not currently associated with the member device of the online social network;
　wherein the member identification processor is configured to identify member identification information of the online social network that has attribute information associated with the identified proficiency information or ability information; and
　wherein the recommendation processor is configured to generate a list that includes information identifying books, events, classes, groups, or webpages based on the member identification information that has attribute information associated with the identified proficiency information or ability information.

19. A non-transitory computer-readable storage medium whose contents, when executed by a computing system, cause the computing system to perform operations, comprising:
　identifying member identification information of an online social network that is associated with skill information;
　accessing information that identifies resources associated with the skill information;
　determining a ranking for each of the identified resources, wherein the ranking is based on attribute information associated with member identification information of the online social network associated with the resource, wherein the member identification attribute information includes a location, and further wherein the ranking is based on attribute information of the member device including location of the member device;
　in response to receiving a request to provide information about the skill information, generating a user interface that presents a description of one or more of the identified resources that are associated with the skill information and generating the user interface based on the determined rankings; and
　presenting the generated user interface on a computer display device;
　wherein the member identification information of the online social network is identified based on profile information associated with the member identification information of the online social network.

20. The non-transitory computer-readable storage medium of claim 19, further comprising:
　determining a ranking for each of the one or more identified resources that are associated with the skill information, wherein the ranking is based on endorsement information of the resource associated with the member identification information of the online social network; and
　wherein generating a user interface that presents a description of one or more of the identified resources that are associated with the skill information includes generating a user interface that presents descriptions of the one or more of the identified resources according the determined rankings.

21. The non-transitory computer-readable storage medium of claim 19,
　wherein generating a user interface that presents a description of one or more of the identified resources that are associated with the skill information includes generating a user interface that presents descriptions of the one or more of the identified resources according the determined rankings.

22. The non-transitory computer-readable storage medium of claim 19, further comprising:
　determining a score for each of the one or more identified resources that are associated with the skill information, wherein the score is based on expertise information associated with member identification information of the social network endorsing the resource; and
　wherein generating a user interface that presents a description of one or more of the identified resources that are associated with the skill information includes generating a user interface that presents descriptions of one or more of the identified resources with scores exceeding a threshold.

23. The non-transitory computer-readable storage medium of claim 19, wherein generating a user interface that presents a description of one or more of the identified resources that are associated with the skill information includes generating a user interface that presents, for each of the identified recommended resources, information identifying the resource and information identifying member identification information of the online social network identifying the resource.

24. The non-transitory computer-readable storage medium of claim 19,
　wherein generating a user interface that presents a description of one or more of the identified resources that are associated with the skill information includes generating a user interface that presents, for each of the identified recommended resources, information identifying the resource, information identifying member identification information of the online social network identifying the resource, and information identifying other member identification information of the online social network endorsing the resource.

25. The non-transitory computer-readable storage medium of claim 19, wherein generating a user interface that presents a description of one or more of the identified resources that are associated with the skill information includes generating a user interface that presents, for each of the identified recommended resources, information identifying the resource and an actionable button that facilitates acquisition of the resource.

26. The non-transitory computer-readable storage medium of claim 19, wherein generating a user interface that presents a description of one or more of the identified resources that are associated with the skill information includes generating a user interface that presents, for each of the identified recommended resources, information identifying the resource and an actionable element that enables feedback associated with the resource.

27. The non-transitory computer-readable storage medium of claim 19, wherein accessing information identifying resources associated with the skill information, includes accessing information that identifies at least one book, event, or webpage associated with the skill information.

28. The non-transitory computer-readable storage medium of claim 19, further comprising:
　receiving information identifying a sponsor device of the skill information;
　wherein generating a user interface that presents a description of one or more of the identified resources that are associated with the skill information includes generating a user interface that presents a description of at least one resource that is associated with the sponsor device of the skill information.

\* \* \* \* \*